(12) United States Patent
Kokubo

(10) Patent No.: US 7,646,479 B2
(45) Date of Patent: Jan. 12, 2010

(54) RECORDING MEDIUM DISCRIMINATION APPARATUS AND METHOD

(75) Inventor: Yoshitaka Kokubo, Shizuoka-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 935 days.

(21) Appl. No.: 11/146,080

(22) Filed: Jun. 7, 2005

(65) Prior Publication Data

US 2005/0276198 A1 Dec. 15, 2005

(30) Foreign Application Priority Data

Jun. 11, 2004 (JP) ............................. 2004-174685
May 30, 2005 (JP) ............................. 2005-157540

(51) Int. Cl.
*G01N 21/00* (2006.01)
(52) U.S. Cl. .................................. 356/239.1; 356/239.7
(58) Field of Classification Search .............. 356/239.1, 356/239.7, 237.1–237.6; 369/53.22, 47.1–47.16, 369/53.1–53.2, 275.3, 59.25, 94, 47.51, 13.24, 369/84
See application file for complete search history.

(56) References Cited

U.S. PATENT DOCUMENTS

| 5,287,167 A * | 2/1994 | Shirai et al. .................. 356/364 |
| 6,853,393 B2 * | 2/2005 | Akita .......................... 347/129 |
| 7,313,067 B2 * | 12/2007 | Higashiyama ............. 369/53.2 |

* cited by examiner

*Primary Examiner*—Gregory J Toatley, Jr.
*Assistant Examiner*—Tri T Ton
(74) *Attorney, Agent, or Firm*—Fitzpatrick, Cella, Harper & Scinto

(57) ABSTRACT

An apparatus can correctly discriminate between types of a recording medium, and obtain good fixed image by performing fixing in the optimum fixing conditions for a variety of different types of recording media. The apparatus includes an LED 101 serving as a first irradiation section, an LED 104 serving as a second irradiation section, a phototransistor 103 serving as a first reading section, and a phototransistor 102 serving as a second reading section. The light output from the LED 101 operating as the light source and passing through a slit 111 illuminates a surface of recording paper P on a recording paper conveyance guide 105. Besides, the recording paper conveyance guide 105 has a window opened for illuminating the recording paper from its underside in the present embodiment. The reflected light from the recording paper P is gathered via slits 112 and 113 and is received by the phototransistors 102 and 103.

25 Claims, 13 Drawing Sheets

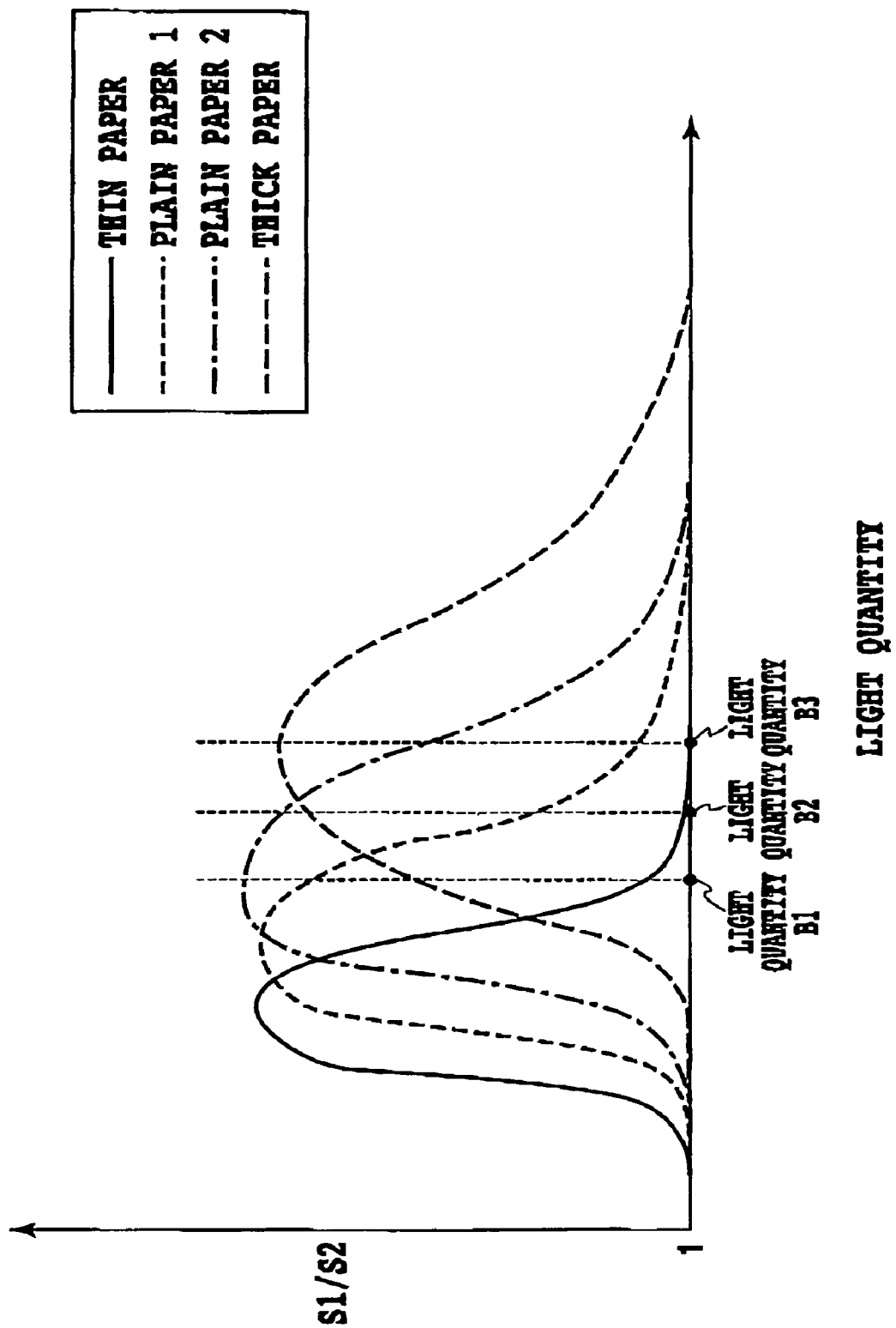

RECORDING MEDIUM DISCRIMINATION APPARATUS AND METHOD

BACKGROUND OF THE INVENTION

1. Field of the Invention

The present invention relates to a recording medium discrimination apparatus and method, and more particularly to a recording medium discrimination apparatus and method for distinguishing between the types of a recording medium by detecting reflected light from a surface of the recording medium and the quantity of transmitted light through the recording medium.

2. Description of Related Art

An image forming apparatus such as a copying machine and laser printer transfers to a recording medium an image to be visualized and developed by a developing section, and fixes the developed image by applying heat and pressure in predetermined fixing conditions. Since the predetermined fixing conditions differ greatly depending on the material, thickness, surface processing and the like of the recording medium, meticulous settings in accordance with the types of the recording medium are required to make full use of a plurality of types of the recording medium.

Conventionally, such an image forming apparatus displays the sizes and types of the recording medium (paper type when the recording medium is paper) on the operating panel mounted on the image forming apparatus for a user to select, and changes the fixing conditions (such as fixing temperature and transport speed of the recording medium passing through the fixing apparatus) in response to the selection.

In contrast with such a manual method, a technique has been proposed recently which automatically discriminates between the types of the recording medium with a sensor installed in the image forming apparatus for differentiating the recording medium, and carries out variable control of the developing conditions, transfer conditions or fixing conditions in response to the type differentiated.

The technique for automatically detecting the type of the recording medium includes the following methods: a method of acquiring a surface image of the recording medium with a CCD sensor, and detecting the degree of the surface smoothness of the recording medium by converting the information to fractal dimension information; a method of acquiring a surface image of the recording medium with a CCD sensor or CMOS sensor, and discriminating between paper types from the degree of the surface smoothness by detecting the degree of the roughness of the recording medium from the intensity of the light of the surface image; and a method of detecting the thickness of the recording medium from the length of a shadow formed at the edge of the recording medium (for example, see Japanese patent application laid-open No. 2001-139189).

However, the foregoing methods of detecting the degree of the surface smoothness of the recording medium cannot discriminate between recording media such as plain paper and cardboard which have nearly the same surface smoothness, but have a different compression state of paper fibers. Thus, the method can make a wrong decision of the cardboard as plain paper, and hence cannot carry out suitable settings for the recording paper in terms of the developing conditions, fixing conditions and transfer conditions, thereby offering a problem of deteriorating the fixing property.

On the other hand, as for the method of deciding the thickness of the material of the recording medium, it cannot discern the smoothness of the surface of the recording medium. Thus, as to glossy paper or the like which has more difficulty in passing light than plain paper, it makes a thicker decision as to the thickness of the material, and hence prevents proper setting of the conditions.

In addition, in spite of increasing types of recording media, demands for print quality have been increased recently, and hence accurate discrimination between a wide variety of recording media is required.

SUMMARY OF THE INVENTION

The present invention is implemented to solve the foregoing problems. It is therefore an object of the present invention to provide a recording medium discrimination apparatus, image forming apparatus and recording medium discrimination method capable of making automatic discrimination between many different types of recording media, and forming an image in appropriate conditions.

The recording medium discrimination apparatus according to the present invention is characterized by comprising: a first irradiation section for illuminating a recording medium to obtain reflected light from a surface of the recording medium; a second irradiation section for illuminating the recording medium to obtain transmitted light from the recording medium; a plurality of reading sections for reading regularly reflected light and diffusely reflected light reflected from the recording medium illuminated by the first irradiation section, and for reading regularly transmitted light and diffusely transmitted light transmitted through the recording medium illuminated by the second irradiation section; and a discrimination section for discriminating between types of the recording medium by using a reflected light ratio defined as a ratio between a regularly reflected light quantity and a diffusely reflected light quantity obtained by the plurality of reading sections, and a transmitted light ratio defined as a ratio between a regularly transmitted light quantity and a diffusely transmitted light quantity obtained by the plurality of reading sections.

The recording medium discrimination method according to the present invention is characterized by comprising: a reflected light reading step of illuminating a recording medium to obtain reflected light from a surface of the recording medium, and of reading regularly reflected light and diffusely reflected light obtained from the recording medium; a transmitted light reading step of illuminating the recording medium to obtain transmitted light through the recording medium, and of reading regularly transmitted light and diffusely transmitted light transmitted through the recording medium; and a discrimination step of discriminating between types of the recording medium by using a reflected light ratio defined as a ratio between a regularly reflected light quantity and a diffusely reflected light quantity which are read, and a transmitted light ratio defined as a ratio between a regularly transmitted light quantity and a diffusely transmitted light quantity which are read.

The image forming apparatus according to the present invention is characterized by comprising in an image forming apparatus including a latent image bearing member for supporting a latent image, a developing section for visualizing the latent image as a developed image by providing the latent image bearing member with a developing agent, a transfer section for transferring the developed image by the developing section to a recording medium conveyed in a predetermined direction, and a fixing section for fixing the developed image on the recording medium by heating and pressing the recording medium, to which the developed image is transferred by the transfer section, in predetermined fixing conditions: a first irradiation section for illuminating the recording medium to obtain reflected light from a surface of the recording medium; a second irradiation section for illuminating the recording medium to obtain transmitted light from the recording medium; a plurality of reading means for reading regularly reflected light and diffusely reflected light reflected from the recording medium illuminated by the first irradiation section, and for reading regularly transmitted light and diffusely transmitted light transmitted through the recording medium illuminated by the second irradiation section; and a discrimination section for discriminating between types of the recording medium by using a reflected light ratio defined as a ratio between a regularly reflected light quantity and a diffusely reflected light quantity obtained by the plurality of reading means, and a transmitted light ratio defined as a ratio between a regularly transmitted light quantity and a diffusely transmitted light quantity obtained by the plurality of reading means, wherein the developed image is fixed on the recording medium by the fixing section in the fixing conditions corresponding to the type of the recording medium discriminated.

The image forming apparatus according to the present invention is characterized by comprising in an image forming apparatus including an image bearing member; a developing section for developing a latent image by providing a developing agent to the latent image formed on the image bearing member; a transfer section for transferring the developed image developed on the recording medium by the developing section; and a fixing section for fixing the developed image transferred on the recording medium by the transfer section: a first irradiation section for illuminating the recording medium to obtain reflected light from a surface of the recording medium; a second irradiation section for illuminating the recording medium to obtain transmitted light from the recording medium; and a plurality of reading means for reading regularly reflected light and diffusely reflected light reflected from the recording medium illuminated by the first irradiation section, and for reading regularly transmitted light and diffusely transmitted light transmitted through the recording medium illuminated by the second irradiation sections wherein the developed image is fixed on the recording medium by setting fixing conditions of the fixing section in accordance with a reflected light ratio defined as a ratio between a regularly reflected light quantity and a diffusely reflected light quantity obtained by the plurality of reading means, and a transmitted light ratio defined as a ratio between a regularly transmitted light quantity and a diffusely transmitted light quantity obtained by the plurality of reading means.

The recording medium discrimination apparatus according to the present invention is characterized by comprising: a irradiation section for illuminating a recording medium; a first photodetecting section for receiving regularly transmitted light passing through the recording medium illuminated by the irradiation section; a second photodetecting section for receiving diffusely transmitted light passing through the recording medium illuminated by the irradiation section; and a discrimination section for discriminating between types of the recording medium in response to an output obtained from the first photodetecting section and an output obtained from the second photodetecting section.

The recording medium discrimination method according to the present invention is characterized by comprising: a step of illuminating a recording medium; a step of receiving regularly transmitted light passing through the recording medium; a step of receiving diffusely transmitted light passing through the recording medium; and a step of discriminating between types of the recording medium on a basis of the regularly transmitted light and the diffusely transmitted light which are received.

The image forming apparatus according to the present invention is characterized by comprising in an image forming apparatus including an image bearing member; a developing section for developing a latent image by providing a developing agent to the latent image formed on the image bearing member; a transfer section for transferring the developed image developed on the recording medium by the developing section; and a fixing section for fixing the developed image transferred on the recording medium by the transfer section: a irradiation section for illuminating a recording medium; a first photodetecting section for receiving regularly transmitted light passing through the recording medium illuminated by the irradiation section; and a second photodetecting section for receiving diffusely transmitted light passing through the recording medium illuminated by the irradiation section, wherein the developed image is fixed on the recording medium by setting fixing conditions of the fixing section in response to an output obtained from the first photodetecting section and an output obtained from the second photodetecting section.

The above and other objects, effects, features and advantages of the present invention will become more apparent from the following description of embodiments thereof taken in conjunction with the accompanying drawings.

BRIEF DESCRIPTION OF THE DRAWINGS

FIG. 13 is a graph illustrating results of the present embodiment.

DETAILED DESCRIPTION OF THE PREFERRED EMBODIMENTS

The recording medium discrimination apparatus and method in accordance with the present invention will now be described with reference to the accompanying drawings.

First Embodiment

Figure 1:
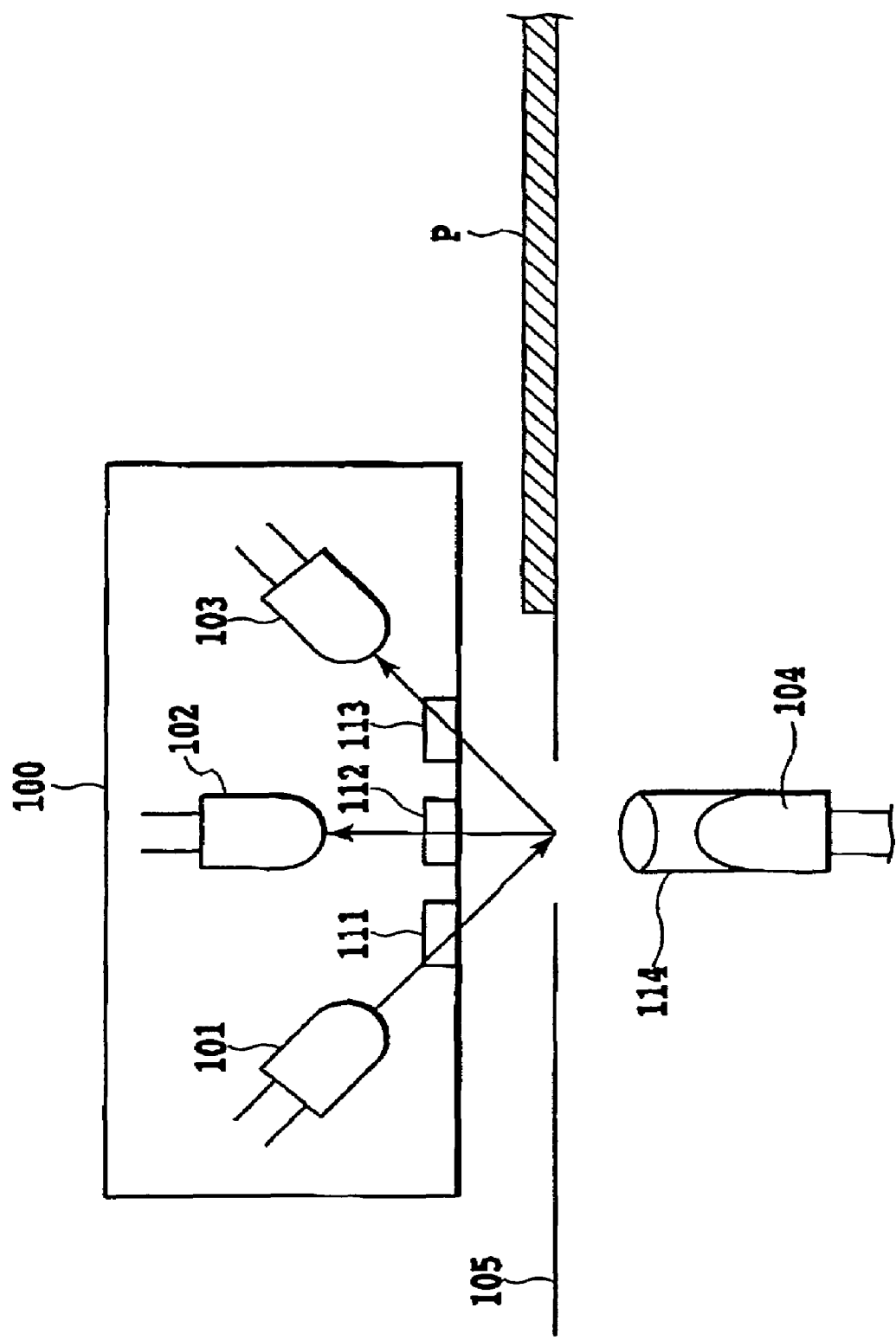
FIG. 1 is a schematic diagram showing a configuration of a recording paper discrimination sensor 100 of a first embodiment in accordance with the present invention.

FIG. 1 shows a configuration of a recording paper discrimination sensor 100 of the first embodiment in accordance with the present invention. As shown in FIG. 1, the recording paper discrimination sensor 100 has an LED 101 serving as a first radiation means, an LED 104 serving as a second radiation means, a phototransistor 103 serving as a first reading means, and a phototransistor 102 serving as a second reading means.

The light emitted from the LED 101, the light source, illuminates a surface of recording paper P on a recording paper conveyance guide 105 through a slit 111. The recording paper conveyance guide 105 has a window for illuminating the recording paper from its underside in the present embodiment. The reflected light from the recording paper P is concentrated through slits 112 and 113 and is received by phototransistors 102 and 103. According to the reflected light received, the glossiness of the recording paper P is detected.

On the other hand, the light emitted from the LED 104, the light source, illuminates the underside of the recording paper P through a condensing guide 114 for concentrating light. The transmitted light from the recording paper P is received by the phototransistors 102 and 103 through the slits 112 and 113. From the transmitted light received, the quantity of transmitted light from the recording paper P is detected. In the present embodiment, the LED 101 is placed in such a manner that the LED light illuminates the surface of the recording paper P at a predetermined angle as shown in FIG. 1. In addition, the LED 104 is placed in such a manner that the LED light illuminates the underside of the recording paper P from the position directly below the phototransistor 102 as shown in FIG. 1.

Figure 2:
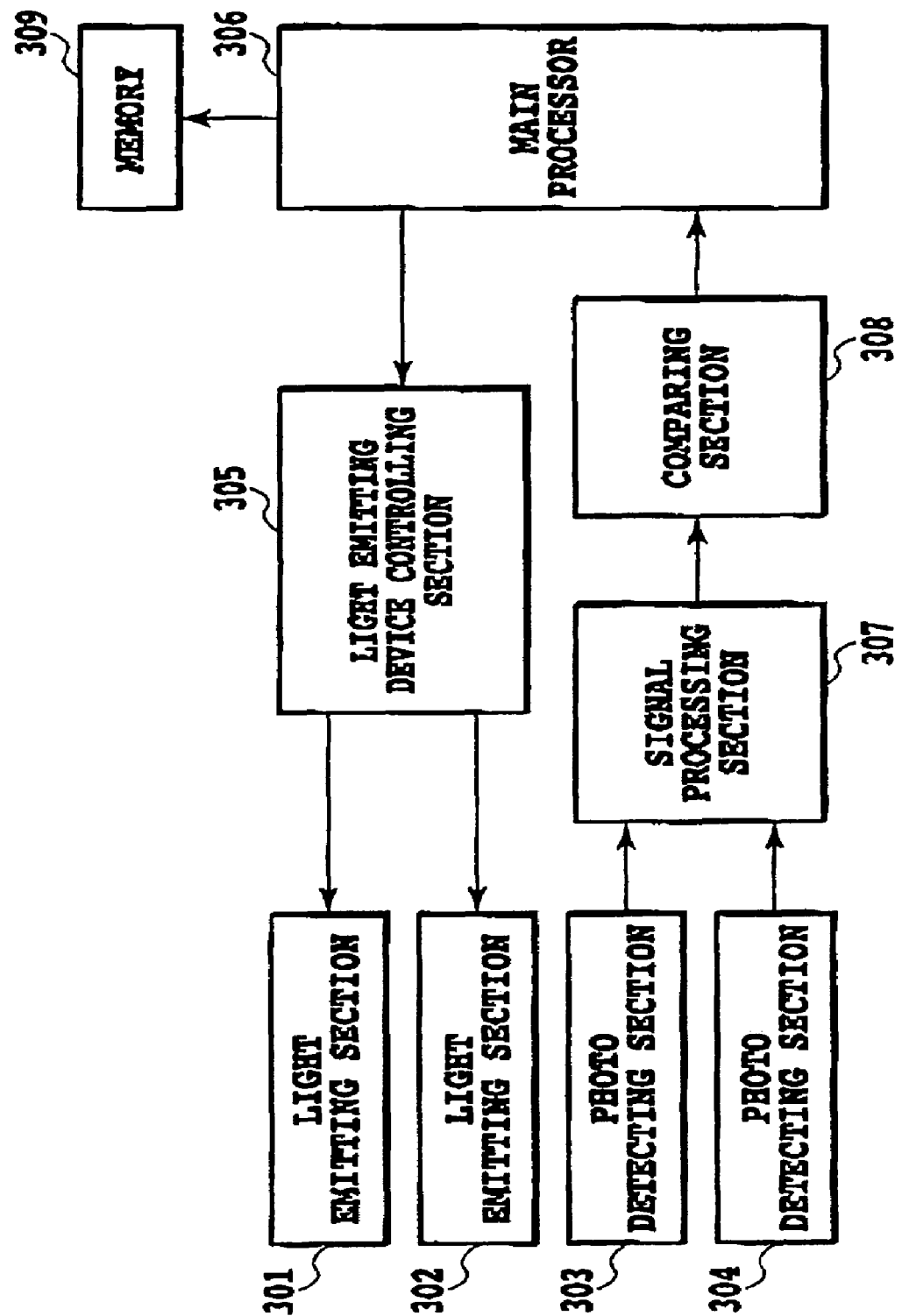
FIG. 2 is a block diagram showing an internal configuration of a sensor controlling section of an embodiment in accordance with the present invention.

Next, referring to FIG. 2, a block diagram showing an internal configuration of a sensor controlling section will be described. A light emitting device controlling section 305 drives light emitting sections 301 and 302, and a main controlling section 306 controls the light emitting device controlling section. A signal processing section 307 carries out calculations after A/D converting output values from photodetecting sections at 16-bit resolution, and obtains the output values of photodetecting sections 303 and 304 (corresponding to the phototransistors 102 and 103 in FIG. 1). As the output values to be calculated, there are values indicating the glossiness of the recording paper (specular reflection output (S1)/diffuse reflection output (S2)), and values indicating transmission property of the recording paper (specular transmission output (S1)/diffuse transmission output (S2)), for example.

A comparing section 308 compares results of the signal processing section 307 with set values stored in a memory 309 in advance. The memory 309, which is a nonvolatile memory such as an EEPROM, stores the set values for the recording paper discrimination. In addition, the memory 309 stores two or more sets of different emitted light quantities for each of the light emitting sections 301 and 302. For example, by using reference paper at factory shipments, regularly reflected light quantities and diffusely reflected light quantities from the reference paper are detected, and the memory 309 stores the results of the detection and two or more sets of different emitted light quantities calculated using these results.

Likewise, as for the light emitting section 302, by using reference paper at factory shipments, for example, regularly transmitted light quantities and diffusely transmitted light quantities from the reference paper are detected, and the memory 309 stores the results of the detection and two or more sets of different emitted light quantities calculated using these results.

Incidentally, the light emitting section 301 corresponds to the LED 101 of FIG. 1, and the light emitting section 302 corresponds to the LED 104.

Next, the reason for allowing the output of two or more sets of different emitted light quantities will be described.

Figure 3:
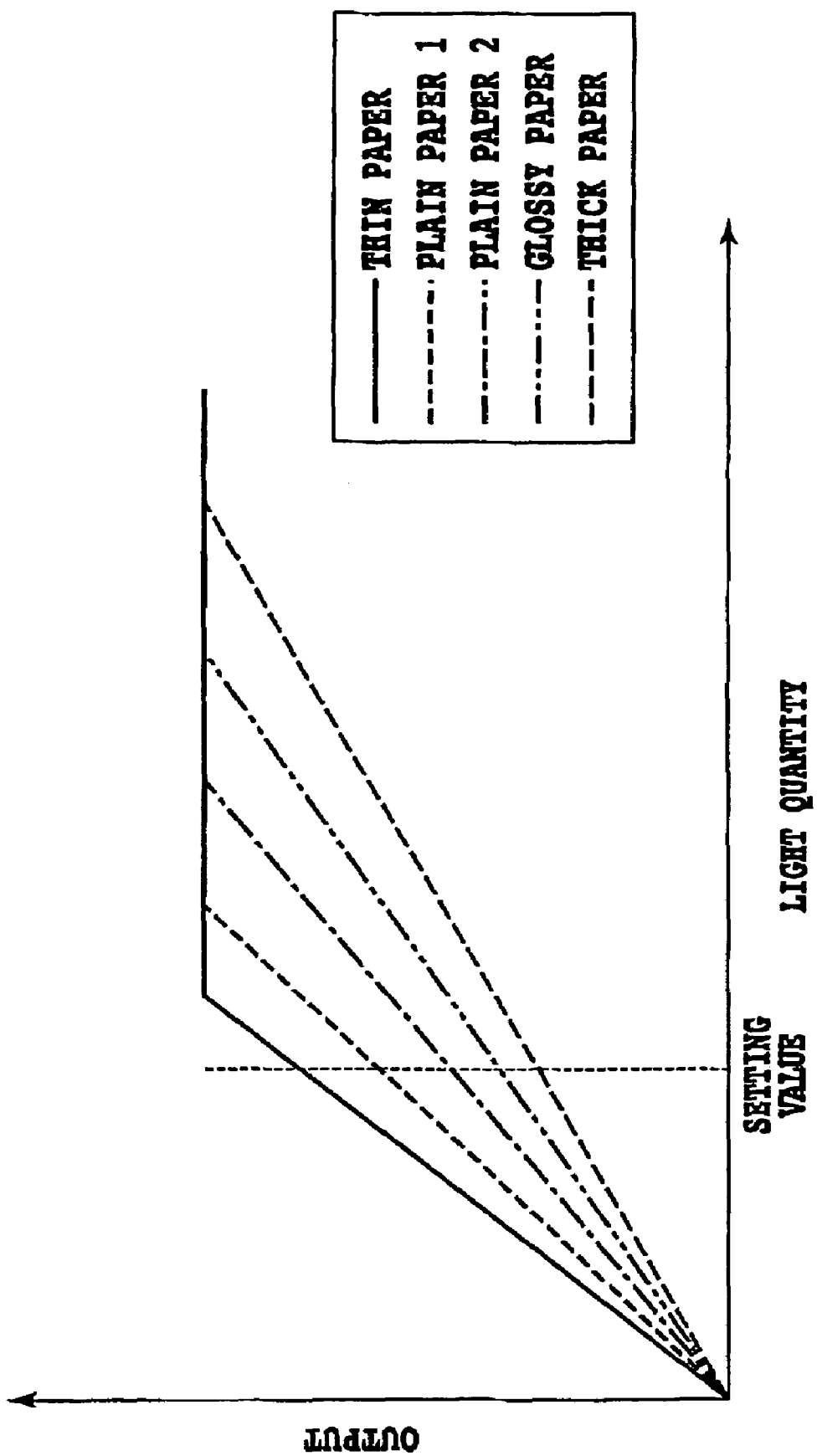
FIG. 3 is a graph illustrating results when the present embodiment has only one emitted light quantity and makes recording paper discrimination with one photodetecting section.
Figure 4:
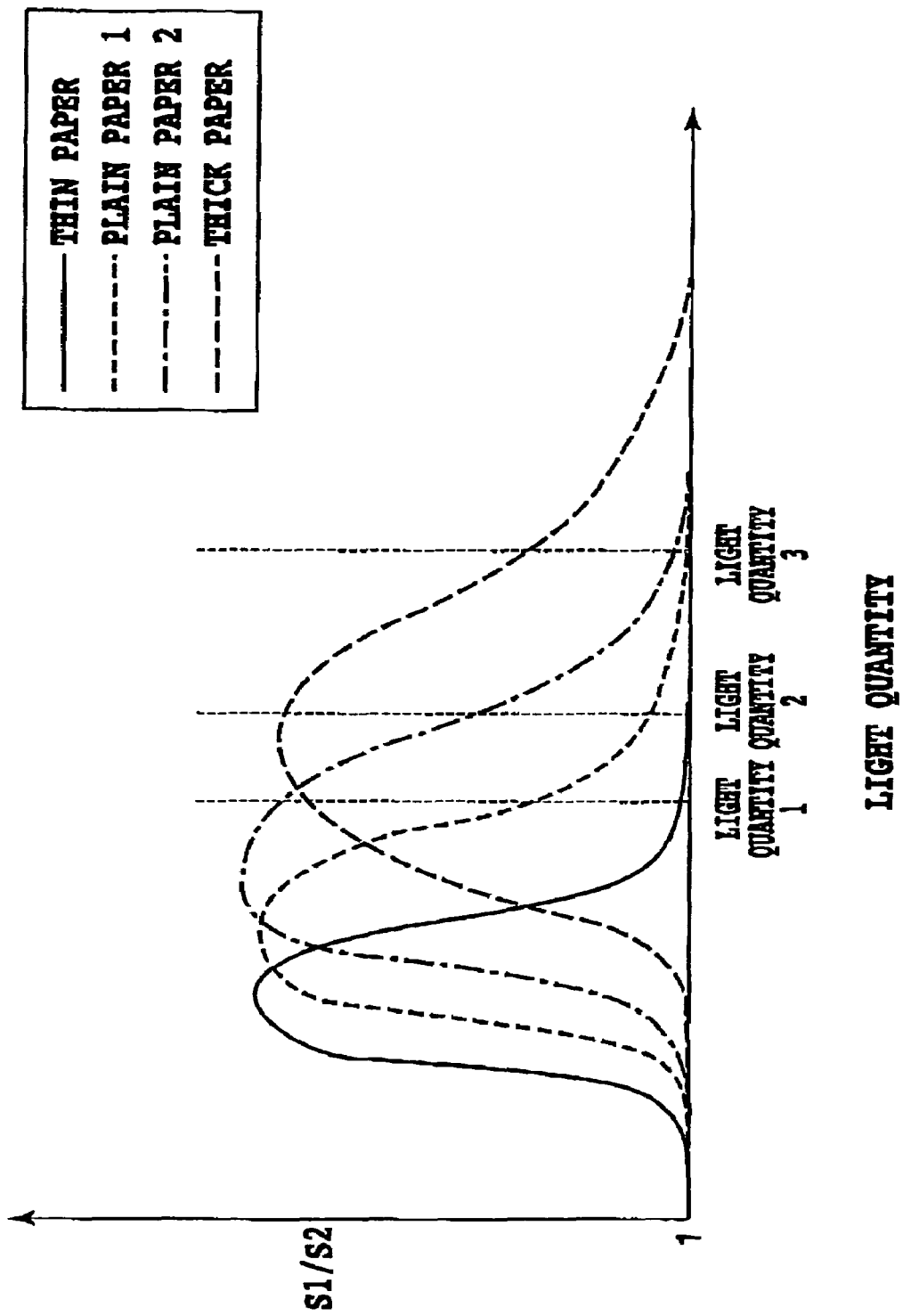
FIG. 4 is a graph illustrating results when the present embodiment has three emitted light quantities and makes recording paper discrimination with two photodetecting sections.
Figure 12:
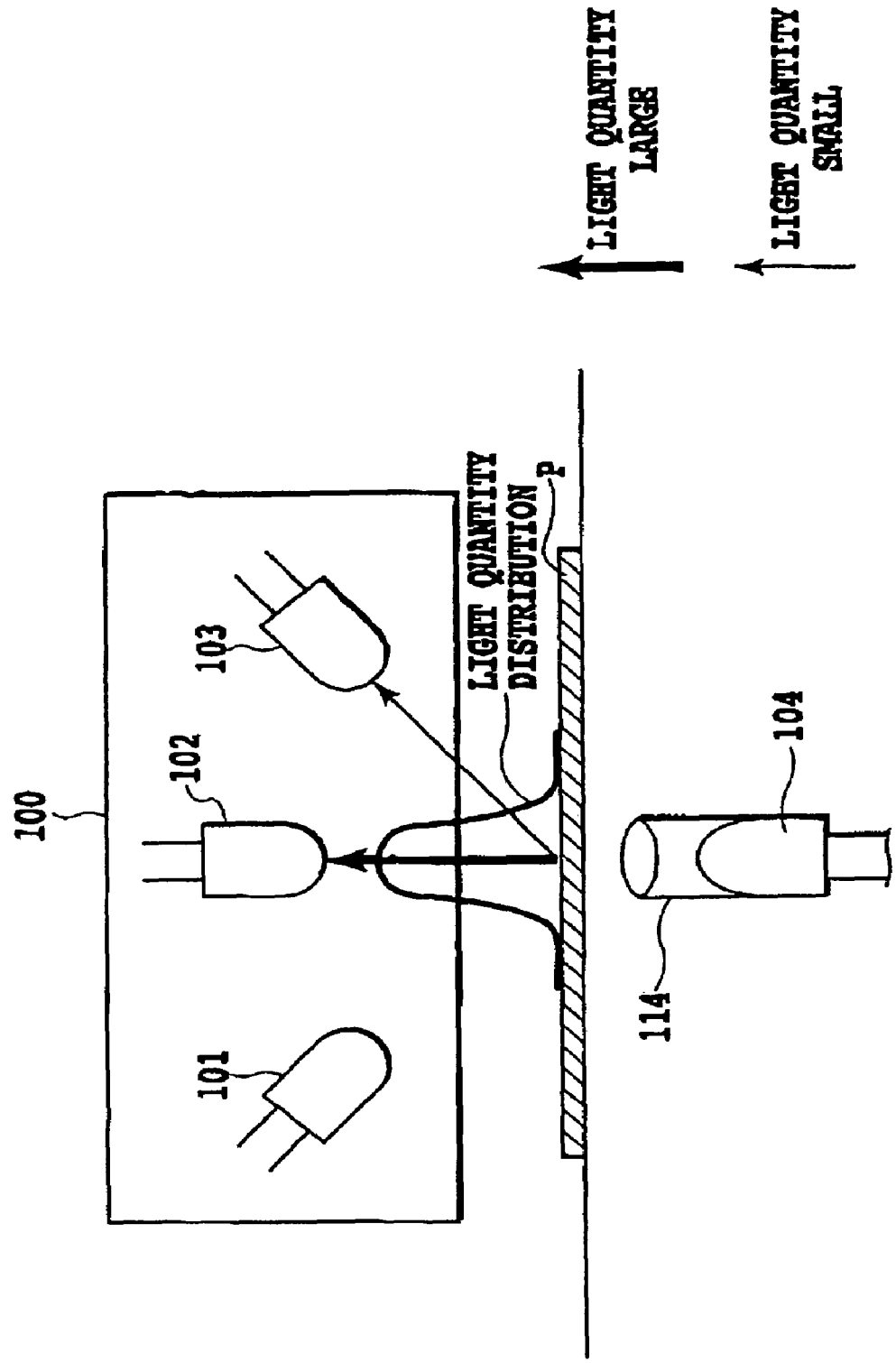
FIG. 12 is a diagram illustrating a reason for providing the present invention with a plurality of types of emitted light quantities and two photodetecting sections.

FIG. 3 illustrates the results of the discrimination between the recording papers, which is carried out in the case where the light emitting section 302 has only one emitted light quantity, and only one photodetecting section is installed. It is found from the results of FIG. 3 that although the types of the recording papers can be discriminated, erroneous decision can be made as to a lot of types of recording papers because of insufficient margins for threshold values. For example, when three or more types of the recording papers are present which are plain paper and have different thicknesses, margins for threshold values for making the discrimination becomes smaller, thereby bringing about erroneous discrimination in some cases. The same results are obtained even if two or more emitted light quantities are used as long as the photodetecting section is only one (in FIG. 3, the discrimination precision little varies even if a plurality of set light quantities are set). In view of this, the two photodetecting sections are provided, and two or more sets of different emitted light quantities (light quantities 1, 2 and 3, for example) are set as illustrated in FIG. 4. Then, taking ratios between the results of the two photodetecting sections (S1/S2, where S1 is the specular transmission output and S2 is the diffuse transmission output), it is found that the discrimination between a variety of types of the recording papers can be made with sufficient margins for the threshold values by varying the light quantities. This is because the phototransistors 102 and 103 serving as the photodetecting sections have different received light quantities (the difference between the received light quantities of S1 and S2 becomes maximum at the peak of S1/S2 of each recording paper in FIG. 4, where the received light quantities S1>S2), and because the received light quantities of the phototransistor 103 having an angle with the illuminated surface is smaller than the received light quantities of the phototransistor 102 because the light quantities from the surface illuminated with the light emitting device 104 has light quantity distribution as illustrated in FIG. 12. Since the patterns of generating the difference between the received light quantities as described above vary depending on the thickness of paper, they have different graphs for the individual recording media as illustrated in FIG. 4. This makes it possible to discriminate between the types of the recording paper with sufficient margins by switching the light quantities. In addition, it is understandable from the foregoing description that the combination of the one emitted light quantity with the two photodetecting sections cannot decide a greater number of types of the recording papers (in FIG. 4, for example, providing only one light quantity 1 makes it difficult to discriminate between the plain paper 2 and a cardboard).

Furthermore, the light emitting section 301 is provided with two or more emitted light quantities as the light emitting section 302 for the reason to improve the discrimination precision of the recording paper. Here, another reason for providing the light emitting section 301 with two or more emitted light quantities will be described.

It is not unlikely that the received light quantity can vary even if the reflected light from the same recording paper is received because of the variations in sensitivity of the photodetecting sections 303 and 304 (phototransistors 102 and 103 of FIG. 1) and the deterioration of the light emitting sections. Thus, a plurality of light quantities are set to correct the deterioration in the light emitting section or the variations in sensitivity. When correcting the variations in the sensitivity of the photodetecting section in the case where the photodetecting section 304 has lower sensitivity than the photodetecting section 303, for example, the light quantity from the photodetecting section 303 is monitored in the case of the light quantity 1, and the light quantity from the photodetecting section 304 is monitored in the case of the light quantity 2 (>light quantity 1). In this case, the light emitting section 301 is controlled in such a manner that it continuously switches the emission of the light quantity 1 and light quantity 2.

Figure 5:
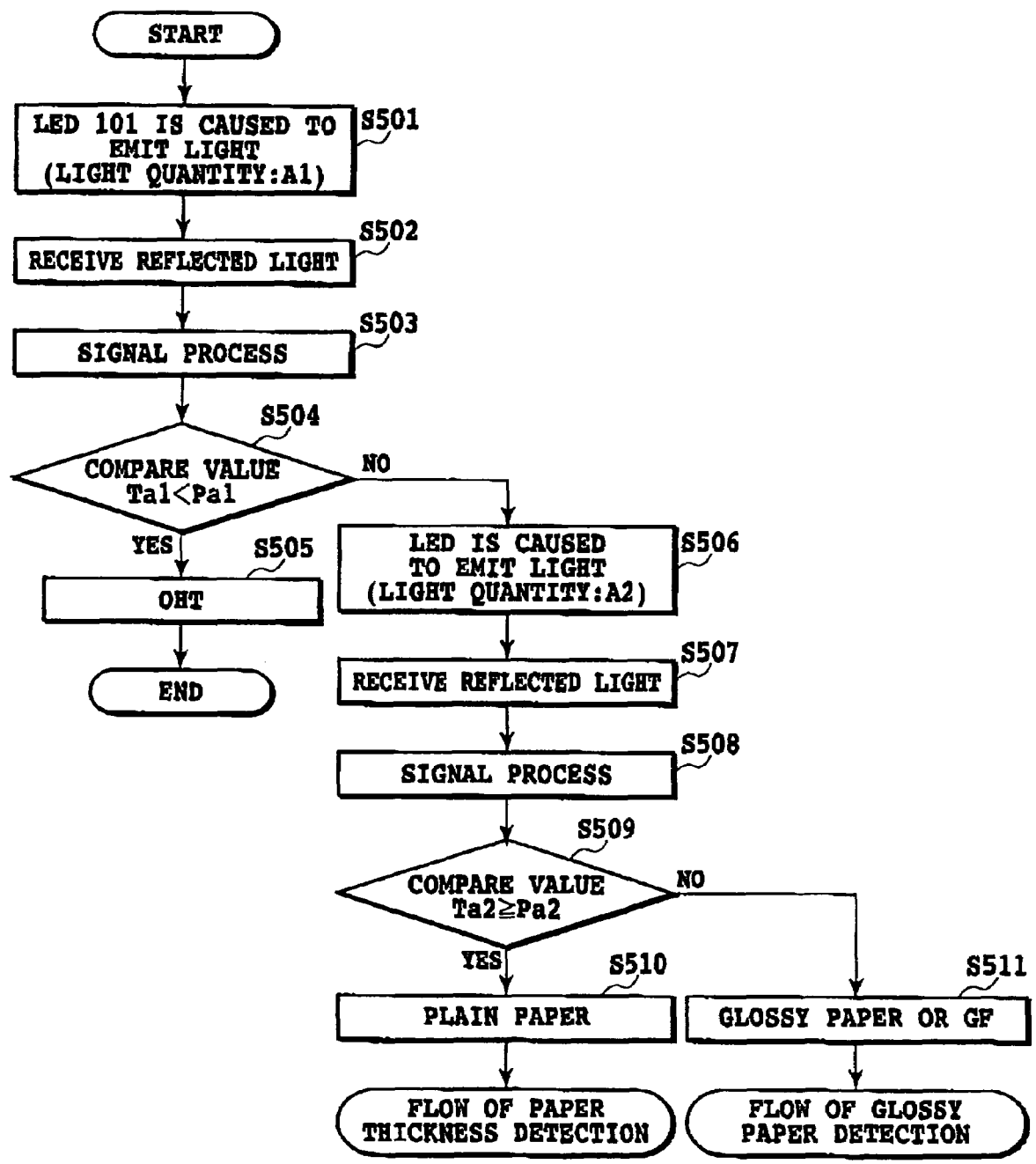
FIG. 5 is a control flowchart of a recording paper discrimination sensor of the present embodiment.

FIG. 5 is a control flowchart of the recording paper discrimination sensor of the present embodiment. First, the LED 101 is caused to emit light at a light quantity A1 obtained by the foregoing method (S501), in which case the LED 104 is kept off. The phototransistors 102 and 103 receive the diffusely reflected light and regularly reflected light (S502), and a value Pa1 indicating the glossiness of the recording paper (regularly reflected light quantity/diffusely reflected light quantity) is obtained by carrying out the signal processing of the output value (S503). Then, comparing the value Pa1 with the glossiness detection threshold value Ta1 stored in the memory in advance (S504), a decision is made that the recording paper is an OHT (overhead transparency) when Ta1<Pa1 (6505).

In the case of Ta1≧Pa1, the LED 101 is caused to emit light at a light quantity A2 (>A1) (S506). As in the foregoing, the phototransistors 102 and 103 receive the diffusely reflected light quantity and regularly reflected light quantity (S507), and a value Pa2 (regularly reflected light quantity/diffusely reflected light quantity) which is obtained by carrying out the signal processing of the output values (S508) is compared (S509). Then, a decision is made that the recording paper is plain paper if Ta2≧Pa2 (S510), but that it is glossy paper or glossy film (S511).

Figure 6:
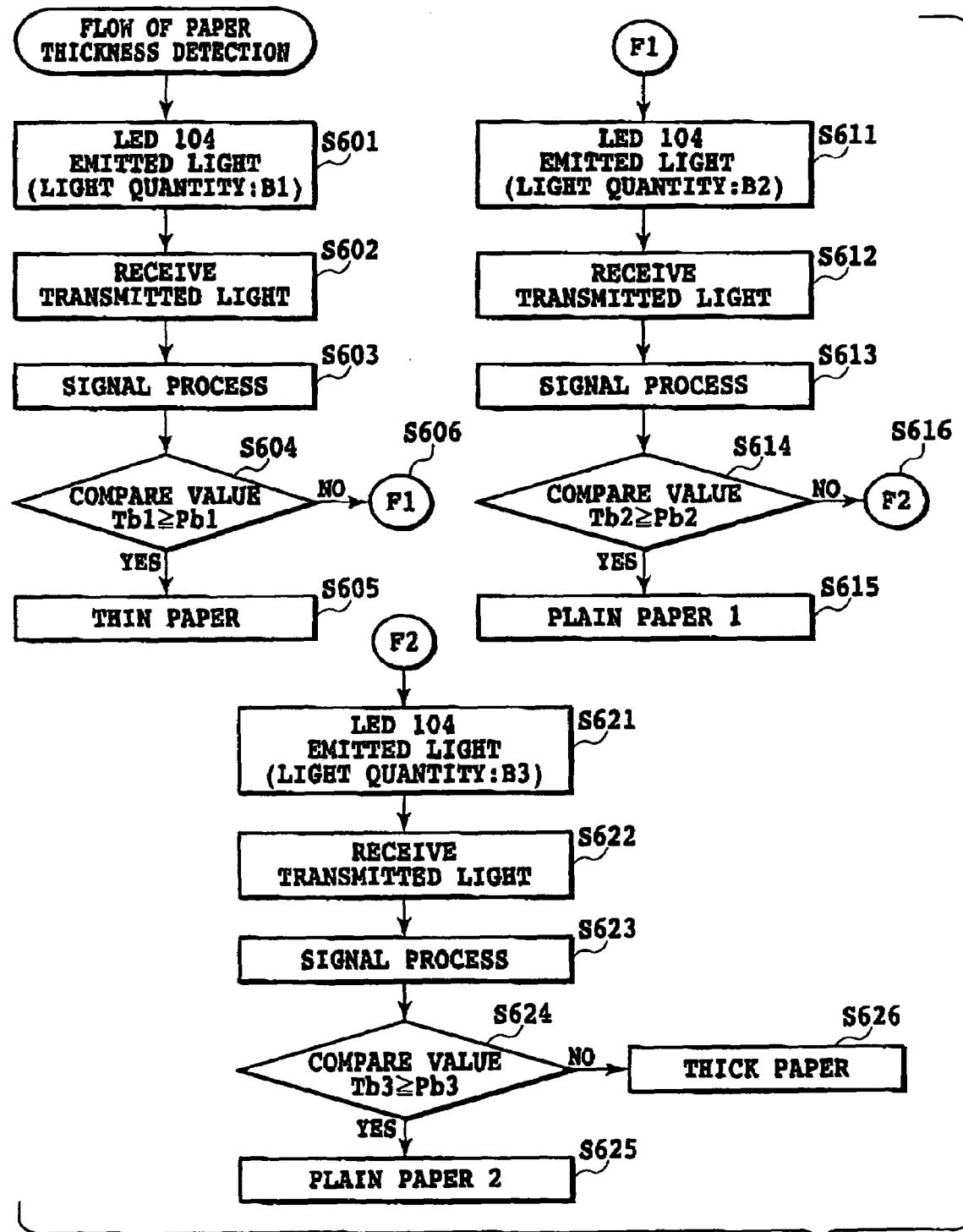
FIG. 6 is a control flowchart of deciding a paper type of those discriminated as plain paper in accordance with paper thickness.

FIG. 6 illustrates a control flow (flowchart of paper thickness detection) of making a decision as to the types of papers which have been determined as the plain paper, according to the paper thickness. In addition, FIG. 13 is a graph illustrating emitted light quantity settings of the LED 104 according to the control flowchart of the recording paper discrimination sensor of FIG. 6.

The LED 104 is caused to emit light at a light quantity B1 with the LED 101 kept in the off state (S601). The phototransistors 102 and 103 receive the regularly transmitted light quantity and diffusely transmitted light quantity (S602). Then, their output values are subjected to signal processing (S603) to obtain the value Pb1 indicating the light transmission property of the recording paper (specular transmission output/diffuse transmission output). Subsequently, the value Pb1 is compared with a light transmission property discrimination threshold value Tb1 stored in the memory in advance (S604). If Tb1≧Pb1, a decision is made that the recording paper is a thin paper (of about 64 g/m$^2$) (S605). In contrast, if Tb1<Pb1 (branching to FP), the LED 104 is caused to emit light at a light quantity B2 (S611). The phototransistors 102 and 103 receive the regularly transmitted light quantity and diffusely transmitted light quantity (S612). Then, their output values are subjected to signal processing (S613) to obtain the value Pb2 indicating the light transmission property of the recording paper (specular transmission output/diffuse transmission output). Subsequently, the value Pb2 is compared with a light transmission property discrimination threshold value Tb2 stored in the memory in advance (S614).

Here, as for the light quantities B1 and B2, they have the relationship of B1<B2. If Tb2≧Pb2, where Pb2 is the value indicating the light transmission property of the recording paper obtained at P1, a decision is made that the recording paper is plain paper 1 (65 to 90 g/m$^2$). In the case of Tb2<Pb2, the LED 104 is caused to emit light at a light quantity B3 (>light quantity B2) (S621). The phototransistors 102 and 103 receive the regularly transmitted light quantity and diffusely transmitted light quantity (S622). Then, their output values are subjected to signal processing (S623) to obtain the value Pb3 indicating the light transmission property of the recording paper (specular transmission output/diffuse transmission output). Subsequently, the value Pb3 is compared with a light transmission property discrimination threshold value Tb3 stored in the memory in advance (S624). If Tb3≧Pb3, where Pb3 is the value indicating the light transmission property of the recording paper obtained at F2 (specular transmission output/diffuse transmission output), a decision is made that the recording paper is plain paper 2 (91 to 120 g/m$^2$) (S625). If Tb3<Pb3, a decision is made that the recording paper is a cardboard (from 121 g/m$^2$) (S626).

Figure 7:
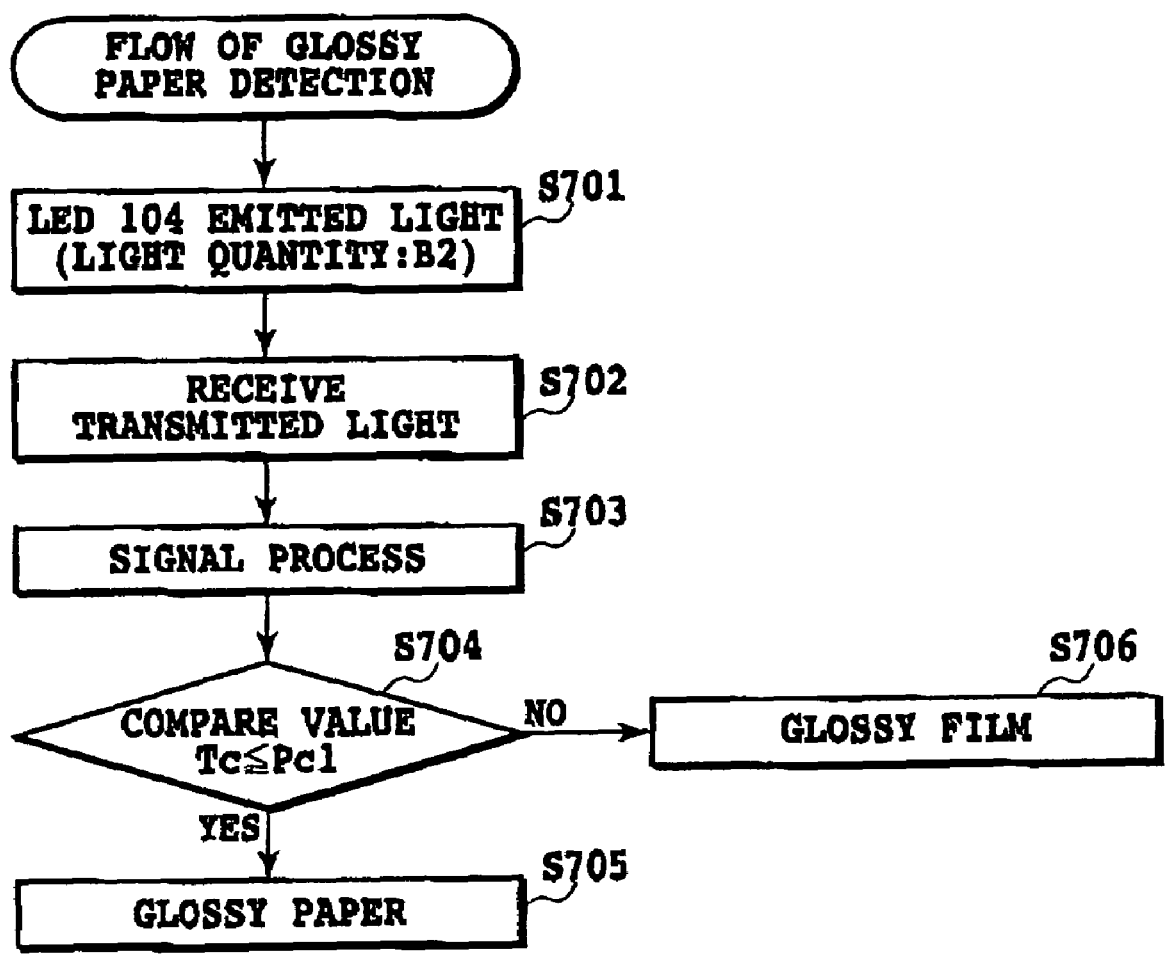
FIG. 7 is a diagram illustrating a sequence of discriminating between glossy paper and glossy film in an embodiment in accordance with the present invention.

Next, referring to FIG. 7, a flow of making a decision as to glossy paper and glossy film (flowchart of detecting the glossy paper/glossy film) which is not made above will be described. If a decision is made at S511 of FIG. 5 that the recording paper is glossy paper or glossy film, the LED 104 is caused to emit light at a light quantity B2 to discriminate between them (S701). The phototransistors 102 and 103 receive the regularly transmitted light quantity and diffusely transmitted light quantity (S702). Then, their output values are subjected to signal processing (8703) to obtain the value Pc1 indicating the light transmission property of the recording paper (specular transmission output/diffuse transmission output). Subsequently, the value Pc1 is compared with a threshold value Tc for discriminating between the glossy paper and glossy film (S704). If Tc≧Pa1, a decision is made that the recording paper is a glossy paper (S705), and if Tc<Pc1, a decision is made that it is glossy film (S706).

As described above, in contrast with the conventional recording paper discrimination sensor, the present embodiment changes the light emitting timing of the first and second radiation means; enables each of the first and second radiation means to output two or more sets of different emitted light quantities; and obtains the glossiness of the recording paper from the ratio "regularly reflected light quantity/diffusely reflected light quantity", and the light transmission property of the recording paper from the ratio "specular transmission output/diffuse transmission output", thereby being able to discriminate between a lot of types of recording papers. In addition, although the present embodiment switches the emitted light quantity from the smaller light quantity B1 to the larger light quantity B2 and then to B3 as illustrated FIG. 13 to illuminate the recording paper, and makes a decision as to whether the recording paper is thin paper in the case of the light quantity B1, is plain paper 1 in the case of the light quantity B2, and is plain paper 2 or cardboard in the case of the light quantity B3, it is also possible to discriminate between the recording papers at nearly the same accuracy when the light quantities are illuminated in the reverse sequence (in the order of B3, B2 and B1).

Second Embodiment

Figure 8:
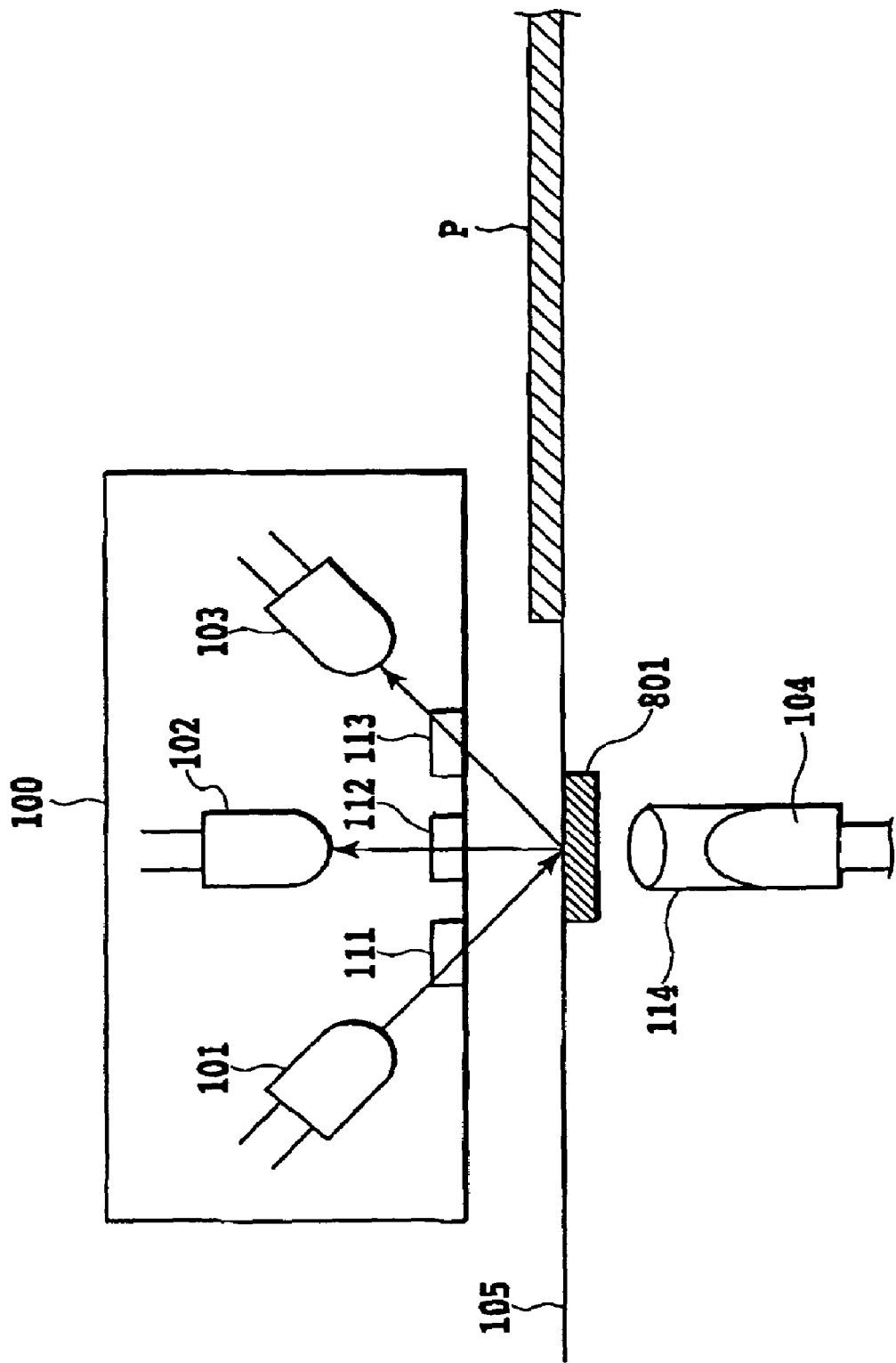
FIG. 8 is a diagram showing a configuration of a recording paper discrimination sensor of a second embodiment in accordance with the present invention.

FIG. 8 is a diagram showing a configuration of a recording paper discrimination sensor of a second embodiment. In FIG. 8, the same or like components to those of the first embodiment are designated by the same reference numerals and their description will be omitted here. As for the recording paper discrimination operation in the present embodiment, it is the same as that of the foregoing first embodiment.

The present embodiment differs from the first embodiment in that it has a reference plate 801 added perpendicularly to the line connecting the phototransistor 102 and LED 104. As a material of the reference plate 801, a material that transmits light to some extent is used rather than a material that prevents the transmission of light completely (such as acrylic resin or plastics). By interposing the reference plate 801 in the above-mentioned place, it is feared that the light quantities transmitted to the phototransistors 102 and 103 are reduced. However, the thickness of the reference plate 801 in the present embodiment is determined in such a manner that the discrimination between all the recording papers to be distinguished is possible, and that the current flowing through the LED 104 never exceeds the rated current when the emitted light quantity of the LED 104 is increased. Such a configuration enables the discrimination between the recording papers to be distinguished. In addition, even if the light quantity of the LED 101 or 104 reduces with time, or the received light quantities decrease because the photodetecting sections are made dirty by paper dust or toner, calibration (adjustment of the emitted light quantity) can be performed using the reference plate, thereby being able to discriminate between the recording papers without reducing the discrimination precision.

In addition to the foregoing method, the following configurations without using the reference plate 801 are possible. First, as for the LEDs 101 and 104, a plurality of light quantities are set in advance at the factory shipments in accordance with expected variations with time of the LEDs and dirt of the photodetecting sections, and then the light quantities are switched on the basis of the information about the amount of usage of the paper type discrimination sensor (such as operation time information), for example. This makes it possible to compensate for the reduction in the received light quantities due to the variations with time of the LEDs or the dirt of the photodetecting sections. The reduction in the received light quantities due to the variations with time of the LEDs or the dirt of the photodetecting sections can also be compensated for by forcefully causing the LED to emit light at predetermined timing during the time in which the paper type discrimination sensor does not carry out the paper type discrimination in the condition without the reference plate 801 or recording paper P, and by using the outputs of the phototransistors 102 and 103.

Third Embodiment

Figure 9:
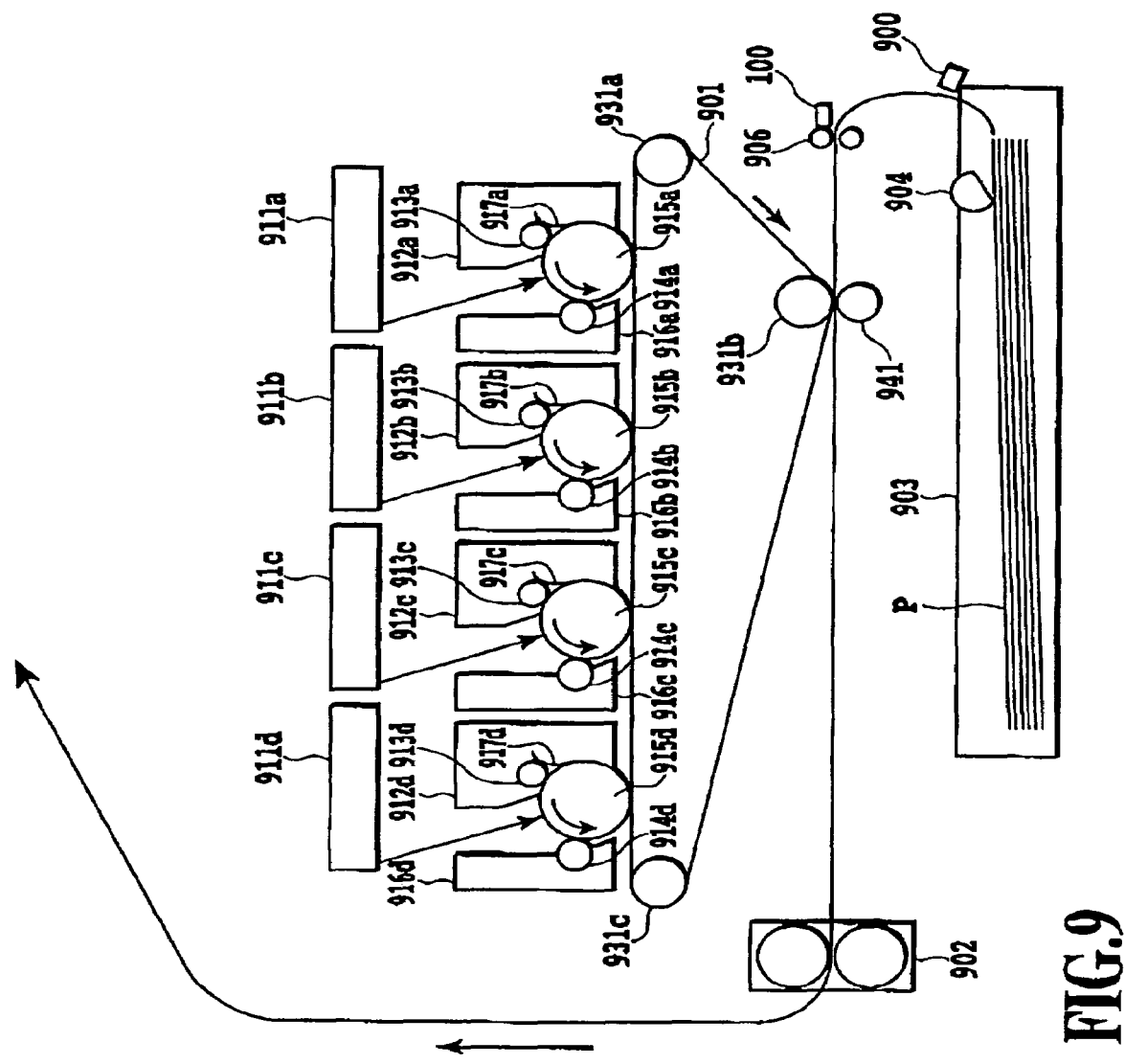
FIG. 9 is a schematic cross-sectional view showing a configuration of an image forming apparatus as an example suitably showing a color image forming apparatus of the present embodiment.

FIG. 9 is a schematic cross-sectional view showing a configuration of an image forming apparatus as an example suitably showing a color image forming apparatus of the present embodiment The color image forming apparatus shown FIG. 9 includes four image forming sections installed for yellow (Y), magenta (M), cyan (C) and black (Bk), respectively. Thus, the following symbols a, b, c, and d attached to the numerals designate components for Y, M, C and Bk, respectively. In addition, an intermediate transfer member unit is placed in opposition to the image forming sections.

The image forming sections have image bearing members 915a, 915b, 915c and 915d; charging sections 913a, 913b, 913a and 913d for uniformly charging the image bearing members 915a, 915b, 915c and 915d to a predetermined potential; laser scanner unit 911a, 911b, 911a and 911d for forming electrostatic latent images by illuminating the charged image bearing members 915a, 915b, 915c and 915d with laser beams corresponding to individual color image data; developing sections 916a, 916b, 916c and 916d for developing the electrostatic latent images formed on the image bearing members 915a, 915b, 915c and 915d, thereby rendering the images visible; sleeve rollers 914a, 914b, 914c and 914d for feeding color toners in the developing sections 916a, 916b, 916c and 916d to image bearing members 915a, 915b, 915c and 915d; and cleaning sections 917a, 917b, 917c and 917d for removing residual toners on the image bearing members 915a, 915b, 915c and 915d after toner transfer. In addition, waste toner units 912a, 912b, 912c and 912d are installed for containing waste toners.

The intermediate transfer member unit includes an intermediate transfer member 901, and the images formed above undergo primary transfer to the intermediate transfer member 901. The intermediate transfer member 901 includes a driving roller 931c for driving the intermediate transfer member 901, a tension roller 931a for providing tension to the intermediate transfer member 901, and a transfer section 941 for carrying out secondary transfer to the recording paper P. At the lower portion of the color image forming apparatus, a paper feed cassette 903 containing the recording papers P is placed. On the conveyance path of the recording paper P from the paper feed cassette 903, there are installed a pickup roller 904 for feeding the recording paper; a recording paper discrimination sensor 100 for detecting the leading edge of the recording paper P, and for adjusting timing for the image forming process; and a register roller 906 for detaining the recording paper P to adjust timing for transferring the images formed from the image bearing members 915a, 915b, 915c and 915d to the intermediate transfer member 901.

The image forming process conditions (such as transfer bias) are set in such a manner that they reflect the detection results of the recording paper discrimination sensor 100, and the images formed on the intermediate transfer member are transferred to the recording paper P. After a fixing section 902 fuses and fixes individual toner images of the four colors transferred on the recording paper P, the fixed recording paper P is sent to the outside, thereby completing the image forming operation. The fixing temperature of the fixing section 902 is also set in such a manner that it reflects the detection results of the recording paper discrimination sensor. Incidentally, since the recording medium discrimination method of the present embodiment is the same as the discrimination method of the first embodiment, the description thereof is omitted here.

Although the first embodiment discriminates between the types of the recording medium according to the outputs of the photodetecting sections 303 and 304, the present embodiment can skip the discrimination between the types of the recording medium based on the outputs of the photodetecting sections 302 and 304 to directly set the fixing conditions of the fixing section 902.

Next, the recording paper discrimination control in the present embodiment will be described. As to a first sheet of the paper feed, the discrimination of the recording paper P is made before the transfer of the images. Thus, the recording paper discrimination is carried out during waiting on the transportation path. In the case of continuous printing, however, since the waiting time of a second sheet and on of the paper feed is much shorter than that of the first sheet, it is impossible to allow for sufficient time to detect the media.

In view of this, as for the second sheet and on of the paper feed, the detection is started at the timing when a predetermined position (leading edge) of the recording paper P reaches the directly under the recording paper discrimination sensor 100. Then, the detection is made during the conveyance of the recording paper P, followed by confirmation as to whether the detection result is the same as that of the first sheet of the paper feed (whether they are the same type of recording paper). For example, if a decision is made that the second sheet differs from the first sheet of the paper feed in the type of the recording paper, control is carried out such that the conveyance of the recording paper is stopped, thereby preventing the passage of the second recording paper.

As described above, the configuration, which places the recording paper discrimination sensor at a midpoint on the conveyance path to enable the discrimination during the conveyance, can circumvent wasteful recording paper ejection.

Figure 10:
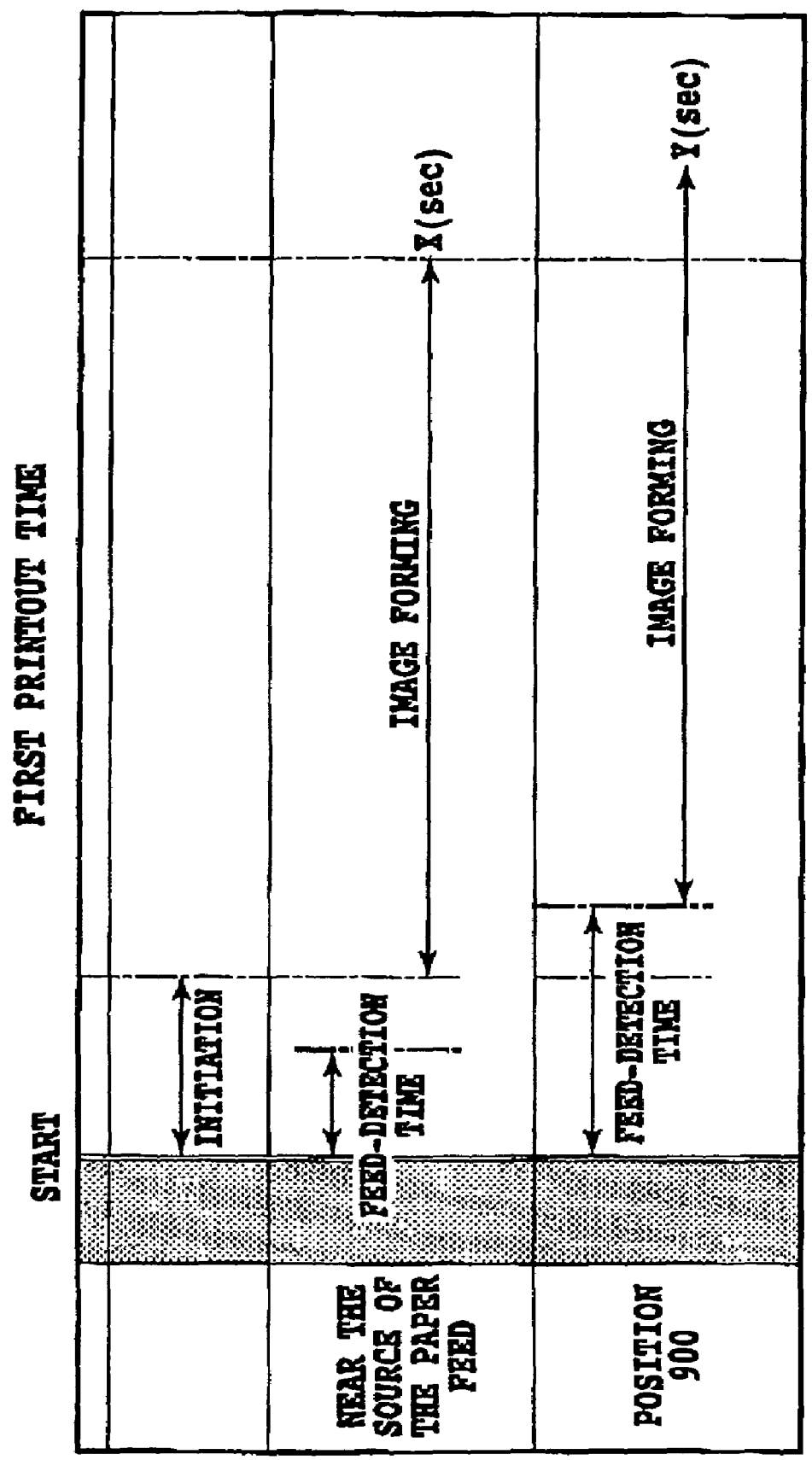
FIG. 10 is a diagram illustrating behavior that can reduce time up to detecting the first recording paper to be printed in the present embodiment.

In addition, a configuration which places the recording paper discrimination sensor 100 near the source of the paper feed (position 900 of FIG. 9) offers, besides an advantage of being able to circumvent the ejection of wasteful recording paper by detecting the mismatch of the second sheet and on of the recording paper, an advantage of being able to further reduce the first printout time because the configuration can advance the detection timing, and reduce the time up to the detection of the recording paper of the first print as illustrated in FIG. 10.

Thus placing the recording paper discrimination sensor near the source of the paper feed enables the reduction in the first printout time, thereby being able to improve the usability.

Fourth Embodiment

Figure 11:
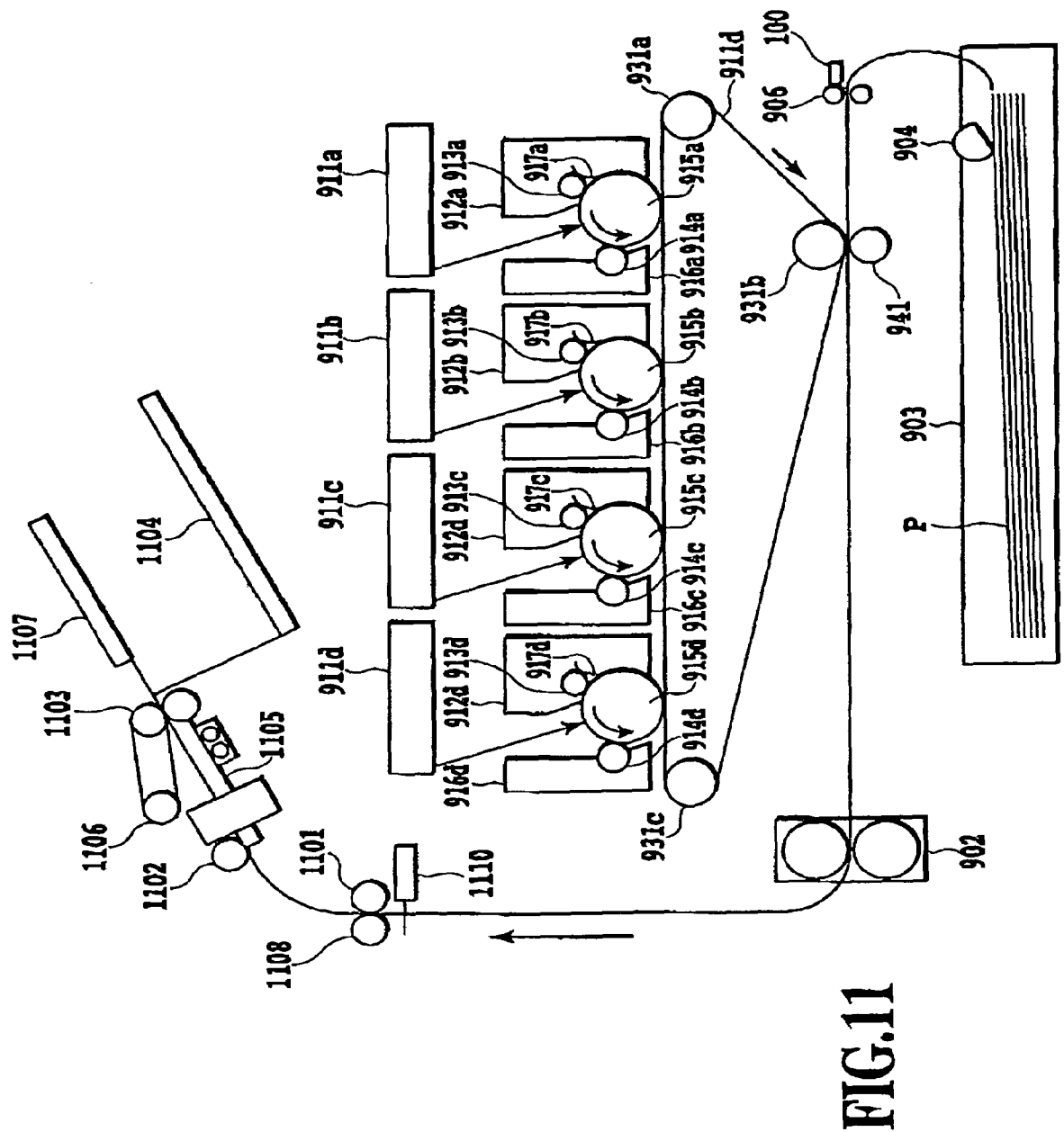
FIG. 11 is a schematic cross-sectional view showing a configuration of an image forming system apparatus as an example suitably showing an image forming system having a recording paper post-processing unit in the image forming apparatus of the present embodiment.

FIG. 11 is a schematic cross-sectional view showing a configuration of an image forming system as an example suitably showing an image forming system having a recording paper post-processing unit in the image forming apparatus of the present embodiment. As for the same or like components to those of the third embodiment, they are designated by the same reference numerals and their description is omitted here.

The recording paper post-processing unit generally has a simple loading mode and a post-processing mode. The simple loading mode refers to a mode in which when the recording paper P passing through the image formation is conveyed from the main unit of the image forming apparatus, the recording paper is carried by an entrance roller 1101, an intermediate roller 1102 and an output roller 1103 to be simply loaded on a loading tray 1104. The post-processing mode, on the other hand, refers to a mode in which a plurality of recording papers P are once loaded on an intermediate loading section 1105 with separating the output roller 1103, registering to a recording paper bundle P' is carried out using a conveyance direction register paddle 1106 and a lateral direction register section 1107, and then the post-processing is carried out such as stapling, punching and foldout by a post-processing section not shown (such as a stapler, a puncher and a recording paper foldout device), followed by outputting the recording paper bundle P' to the loading tray 1104 with pressing the output roller again.

The entrance roller 1101 is provided with a driven roller 1108 rotated by the entrance roller 1101. At a recording paper post-processing unit entrance that accepts the recording paper from the image forming apparatus, an entrance sensor 1110 is installed at an upper stream of the entrance roller 1101 so that the entry of the recording paper P into the unit is detected by the output of the entrance sensor 1110 indicating the entering of the recording paper. Arrows in FIG. 11 show a direction of the conveyance of the recording paper.

After the recording paper discrimination sensor 100 detects the thickness of the recording paper, a CPU (not shown) in the recording paper post-processing unit makes a decision as to the number of papers that can be loaded or subjected to the post-processing by passing the papers through the recording paper post-processing unit in response to the results of the detection. For example, the CPU (not shown) controls the recording paper conveyance in such a manner that W thin papers, X plain papers 1, Y plain papers 2 or Z cardboards (W>X>Y>Z) are passed through to be loaded or subjected to the post-processing.

Such control makes it possible to obviate the need for a photo-interrupter which is necessary for the conventional recording paper post-processing unit for counting the number of sheets entering the thickness detecting section or recording paper post-processing unit, thereby enabling the cost reduction. In addition, since the control can prevent papers beyond the processible number of papers by the recording paper post-processing unit from being passed through, it can improve the quality of the post-processing of the recording paper.

In summary, according to the embodiments, it can precisely differentiate the type of the recording medium, and obtain good images by carrying out forming an image under the optimum image forming conditions for a variety of recording media.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes.

This application claims priority from Japanese Patent Applications Nos. 2004-174685 filed Jun. 11, 2004 and 2005-157540 filed May 30, 2005, which are hereby incorporated by reference herein.

What is claimed is:

1. A recording medium discrimination apparatus comprising:
   a first irradiation section for illuminating a recording medium to obtain reflected light from a surface of the recording medium;
   a second irradiation section for illuminating the recording medium to obtain transmitted light from the recording medium;
   a plurality of reading sections for reading regularly reflected light and diffusely reflected light reflected from the recording medium illuminated by said first irradiation section, and for reading regularly transmitted light and diffusely transmitted light transmitted through the recording medium illuminated by the second irradiation section; and
   a discrimination section for discriminating a type of the recording medium by using a reflected light ratio defined as a ratio of a regularly reflected light quantity and a diffusely reflected light quantity obtained by said plurality of reading sections, and a transmitted light ratio defined as a ratio of a regularly transmitted light quantity and a diffusely transmitted light quantity obtained by said plurality of reading sections.

2. The recording medium discrimination apparatus as claimed in claim 1, wherein said first irradiation section and said second irradiation section each radiate at a plurality of different predetermined light quantities, and said discrimination section discriminates the type of the recording medium by using the reflected light ratio and transmitted light ratio each obtained from the plurality of different predetermined light quantities by said first irradiation section and second irradiation section.

3. The recording medium discrimination apparatus as claimed in claim 2, further comprising a reference plate that has a predetermined reflection characteristic and a predetermined transmission characteristic for light rays radiated from said first irradiation section and said second irradiation section, and is placed at a reading position of the recording medium.

4. The recording medium discrimination apparatus as claimed in claim 1, wherein said first irradiation section and said plurality of reading sections are placed on one side of the recording medium, and said second irradiation section is placed on opposite side of said first irradiation section with respect to the recording medium.

5. The recording medium discrimination apparatus as claimed in claim 1, wherein
said plurality of reading sections comprises a first reading section and a second reading section, and wherein
said second irradiation section and said second reading section are placed at positions opposing via the recording medium, and said first irradiation section and said first reading section are placed at positions having line symmetry with respect to a line connecting said second irradiation section to said second reading section.

6. A recording medium discrimination method comprising:
a reflected light reading step of illuminating a recording medium to obtain reflected light from a surface of the recording medium, and of reading regularly reflected light and diffusely reflected light obtained from the recording medium;
a transmitted light reading step of illuminating the recording medium to obtain transmitted light through the recording medium, and of reading regularly transmitted light and diffusely transmitted light transmitted through the recording medium; and
a discrimination step of discriminating a type of the recording medium by using a reflected light ratio defined as a ratio of a regularly reflected light quantity and a diffusely reflected light quantity which are read, and a transmitted light ratio defined as a ratio of a regularly transmitted light quantity and a diffusely transmitted light quantity which are read.

7. The recording medium discrimination method as claimed in claim 6, wherein the reflected light reading step and the transmitted light reading step radiate a plurality of different predetermined light quantities each, and read reflected light and transmitted light, respectively, and the discrimination step discriminates the type of the recording medium by using the reflected light ratio and the transmitted light ratio each obtained from the plurality of different predetermined light quantities.

8. The recording medium discrimination method as claimed in claim 7, wherein the reflected light reading step or the transmitted light reading step radiates in descending order of emitted light quantities.

9. The recording medium discrimination method as claimed in claim 6, wherein the reflected light reading step or the transmitted light reading step is carried out during conveyance of the recording medium.

10. An image forming apparatus including a image bearing member for bearing a latent image, a developing section for visualizing the latent image as a developed image by providing the image bearing member with a developing agent, a transfer section for transferring the developed image by said developing section to a recording medium conveyed in a predetermined direction, and a fixing section for fixing the developed image on the recording medium by heating and pressing the recording medium, to which the developed image is transferred by the transfer section, in predetermined fixing conditions, said image forming apparatus comprising:
a first irradiation section for illuminating the recording medium to obtain reflected light from a surface of the recording medium;
a second irradiation section for illuminating the recording medium to obtain transmitted light from the recording medium;
a plurality of reading means for reading regularly reflected light and diffusely reflected light reflected from the recording medium illuminated by said first irradiation section, and for reading regularly transmitted light and diffusely transmitted light transmitted through the recording medium illuminated by said second irradiation section; and
a discrimination section for discriminating a type of the recording medium by using a reflected light ratio defined as a ratio of a regularly reflected light quantity and a diffusely reflected light quantity obtained by said plurality of reading means, and a transmitted light ratio defined as a ratio of a regularly transmitted light quantity and a diffusely transmitted light quantity obtained by said plurality of reading means, wherein
the developed image is fixed on the recording medium by said fixing section in the fixing conditions corresponding to the type of the recording medium discriminated.

11. The image forming apparatus as claimed in claim 10, wherein said first irradiation section and said second irradiation section each radiate at a plurality of different predetermined light quantities, and said discrimination section discriminates the type of the recording medium by using the reflected light ratio and transmitted light ratio each obtained from the plurality of different predetermined light quantities by said first irradiation section and second irradiation section.

12. The image forming apparatus as claimed in claim 11, further comprising a reference plate that has a predetermined reflection characteristic and a predetermined transmission characteristic for light rays radiated from said first irradiation section and said second irradiation section, and is placed at a reading position of the recording medium.

13. The image forming apparatus as claimed in claim 10, wherein said first irradiation section and said plurality of reading sections are placed on one side of the recording medium, and said second irradiation section is placed on opposite side of said first irradiation section with respect to the recording medium.

14. The image forming apparatus as claimed in claim 10, wherein
said plurality of reading sections comprises a first reading section and a second reading section, and wherein
said second irradiation section and said second reading section are placed at positions opposing via the recording medium, and said first irradiation section and said first reading section are placed at positions having line symmetry with respect to a line connecting said second irradiation section to said second reading section.

15. The image forming apparatus as claimed in claim 10, further comprising post-processing control means for varying a number of sheets to be supplied to a post-processing unit in response to the type of the recording medium decided by said discrimination means.

16. The image forming apparatus as claimed in claim 15, wherein said post-processing unit has a staple stacker.

17. The image forming apparatus as claimed in claim 15, wherein said post-processing unit has a paper foldout function.

18. An image forming apparatus including an image bearing member; a developing section for developing a latent image by providing a developing agent to the latent image formed on said image bearing member; a transfer section for transferring the developed image developed on the recording medium by said developing section; and a fixing section for fixing the developed image transferred on the recording medium by said transfer section, said image forming apparatus comprising:
  a first irradiation section for illuminating the recording medium to obtain reflected light from a surface of the recording medium;
  a second irradiation section for illuminating the recording medium to obtain transmitted light from the recording medium; and
  a plurality of reading means for reading regularly reflected light and diffusely reflected light reflected from the recording medium illuminated by said first irradiation section, and for reading regularly transmitted light and diffusely transmitted light transmitted through the recording medium illuminated by said second irradiation section, wherein
  the developed image is fixed on the recording medium by setting fixing conditions of said fixing section in accordance with a reflected light ratio defined as a ratio of a regularly reflected light quantity and a diffusely reflected light quantity obtained by said plurality of reading means, and a transmitted light ratio defined as a ratio of a regularly transmitted light quantity and a diffusely transmitted light quantity obtained by said plurality of reading means.

19. The image forming apparatus as claimed in claim 18, wherein said first irradiation section and said second irradiation section each radiate at a plurality of different predetermined light quantities, and said discrimination section discriminates between the types of the recording medium by using the reflected light ratio and transmitted light ratio each obtained from the plurality of different predetermined light quantities by said first irradiation section and second irradiation section.

20. The image forming apparatus as claimed in claim 18, wherein said first irradiation section and said plurality of reading sections are placed on one side of the recording medium, and said second irradiation section is placed on opposite side of said first irradiation section with respect to the recording medium.

21. The image forming apparatus as claimed in claim 18, wherein
  said plurality of reading sections comprises a first reading section and a second reading section, and wherein
  said second irradiation section and said second reading section are placed at positions opposing via the recording medium, and said first irradiation section and said first reading section are placed at positions having line symmetry with respect to a line connecting said second irradiation section to said second reading section.

22. A recording medium discrimination apparatus comprising:
  an irradiation section for illuminating a recording medium;
  a first photodetecting section for receiving regularly transmitted light passing through the recording medium illuminated by said irradiation section;
  a second photodetecting section for receiving diffusely transmitted light passing through the recording medium illuminated by said irradiation section; and
  a discrimination section for discriminating a thickness of the recording medium by using a ratio of an output obtained from said first detecting section and an output obtained from said second detecting section,
  wherein said discrimination section discriminates the thickness of the recording medium on a basis of a plurality of said ratios obtained when illuminating the recording medium from said irradiation section at a plurality of different predetermined light quantities multiple times.

23. The recording medium discrimination apparatus as claimed in claim 22, wherein said discrimination section determines whether to illuminate the recording medium from said irradiation section at a second light quantity different from a first light quantity the recording medium on a basis of a ratio obtained when illuminating the recording medium from said irradiation section at said first light quantities.

24. A recording medium discrimination method comprising:
  a step of illuminating a recording medium;
  a step of receiving regularly transmitted light passing through the recording medium;
  a step of receiving diffusely transmitted light passing through the recording medium; and
  a step of discriminating a thickness of the recording medium on a basis of a ratio of the regularly transmitted light and the diffusely transmitted light which are received,
  wherein said step of discriminating discriminates the thickness of the recording medium on a basis of a plurality of said ratios of lights transmitted when illuminating the recording medium at a plurality of different light quantities multiple times.

25. An image forming apparatus including an image bearing member; a developing section for developing a latent image by providing a developing agent to the latent image formed on said image bearing member; a transfer section for transferring the developed image developed on the recording medium by said developing section; and a fixing section for fixing the developed image transferred on the recording medium by said transfer section, said image forming apparatus comprising:
  an irradiation section for illuminating a recording medium;
  a first detecting section for receiving regularly transmitted light passing through the recording medium illuminated by said irradiation section; and
  a second detecting section for receiving diffusely transmitted light passing through the recording medium illuminated by said irradiation section;
  a discrimination section for discriminating a thickness of the recording medium by using a ratio of an output obtained from said first detecting section and an output obtained from said second detection section,
  wherein said discrimination section discriminates the thickness of the recording medium on a basis of a plurality of said ratios obtained when illuminating the recording medium from said irradiation section at a plurality of different light quantities multiple times,
  wherein the developed image is fixed on the recording medium by setting fixing conditions of said fixing section on a basis of said discriminated thickness.

* * * * *